(12) United States Patent
Bo

(10) Patent No.: US 7,102,866 B2
(45) Date of Patent: Sep. 5, 2006

(54) POWER LINE PROTECTION

(75) Inventor: Zhiqian Bo, Bath (GB)

(73) Assignee: Areva T&D SA, Paris (FR)

( * ) Notice: Subject to any disclaimer, the term of this patent is extended or adjusted under 35 U.S.C. 154(b) by 398 days.

(21) Appl. No.: 10/431,020

(22) Filed: May 7, 2003

(65) Prior Publication Data
US 2004/0130839 A1    Jul. 8, 2004

(30) Foreign Application Priority Data
May 7, 2002   (GB) ................... 0210300.0

(51) Int. Cl.
*H02H 3/18* (2006.01)
(52) U.S. Cl. .......................................... 361/81
(58) Field of Classification Search ............ 361/80, 361/67, 81, 115, 62, 68, 87
See application file for complete search history.

(56) References Cited

U.S. PATENT DOCUMENTS

| 4,006,387 | A | * | 2/1977 | Hudak ........................ 361/87 |
| 4,254,444 | A | * | 3/1981 | Eriksson et al. ............. 361/82 |
| 4,922,368 | A | * | 5/1990 | Johns ......................... 361/62 |
| 6,369,996 | B1 | * | 4/2002 | Bo ............................. 361/80 |
| 6,373,670 | B1 | * | 4/2002 | Bo ............................. 361/81 |

FOREIGN PATENT DOCUMENTS

| GB | 1 274 117 | 5/1972 |
| GB | 2 054 964 A | 2/1981 |
| GB | 2 212 998 A | 8/1989 |
| GB | 2 341 737 A | 3/2000 |

OTHER PUBLICATIONS

*Overcurrent Protection for Phase and Earth Faults*, Section 9, pp. 129-157, 3rd ed., Jun. 1987 Protective Relays Application Guide.

* cited by examiner

*Primary Examiner*—Adolf Deneke Berhane
*Assistant Examiner*—Robert T. Dang
(74) *Attorney, Agent, or Firm*—Kirschstein, et al.

(57) ABSTRACT

A protection system for an electrical power line system of the type comprising radially connected power line sections, wherein a first electrically upstream one of the line sections is connectable to a power source. The protection system comprises at least one relay installed at or near at least the upstream end of each line section to protect that line section, each relay having an associated circuit breaker. The relays are provided with a first set of accelerated overcurrent functions and a second set of under-current/under-voltage functions, the relays being directional and the first and second sets of functions being time graded in reverse to each other. The first and second sets of functions are distributed amongst the relays such that if an under-current/under-voltage function in a second relay located downstream of a first relay triggers operation of a circuit breaker associated with the second relay, an accelerated overcurrent function in the first relay triggers accelerated operation of a circuit breaker associated with the first relay, thereby to isolate from the power source the line section that the first relay protects.

7 Claims, 5 Drawing Sheets

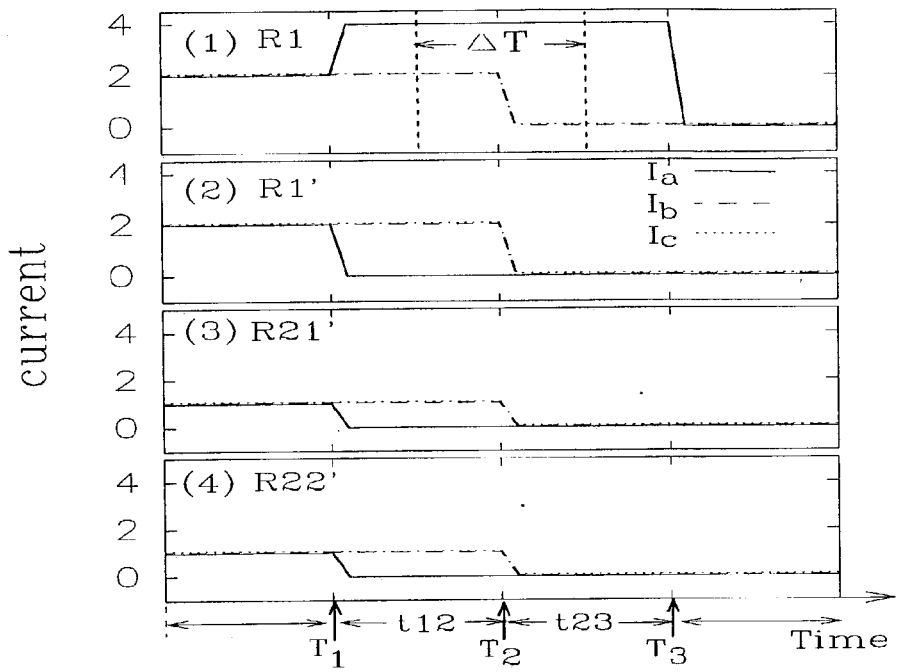
Figure 3a (Fault phase 'a'-'e' on Line L1)
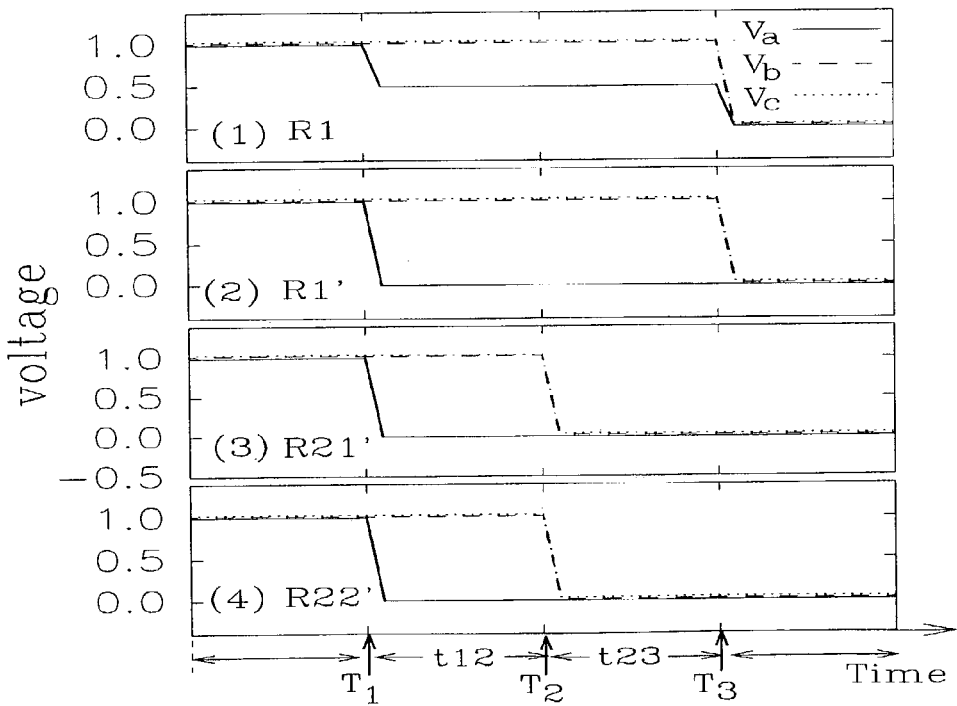
Figure 3b (Fault phase 'a'-'e' on Line L1)

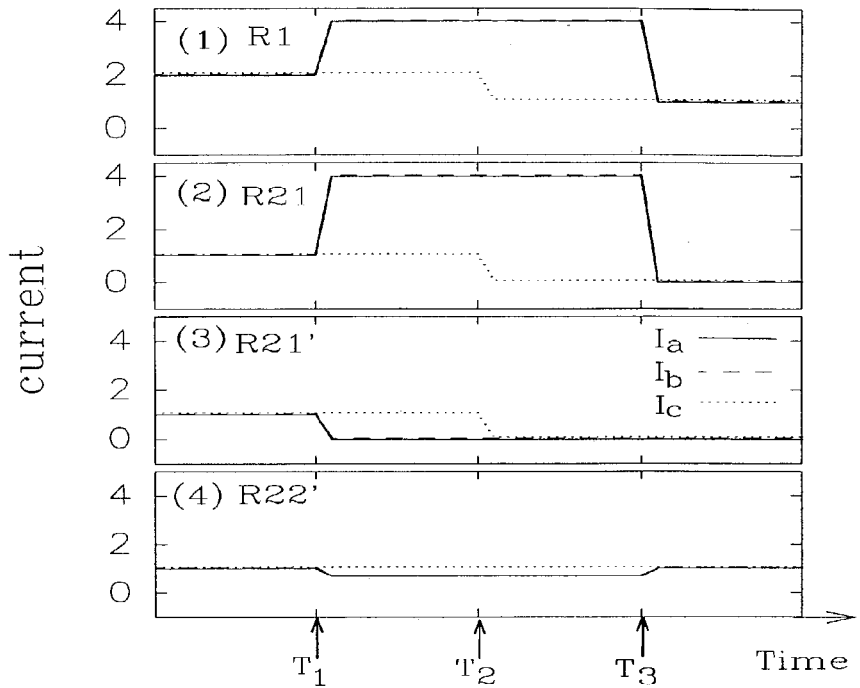
Figure 4a (Fault phase 'a'-'b' on Line L21)
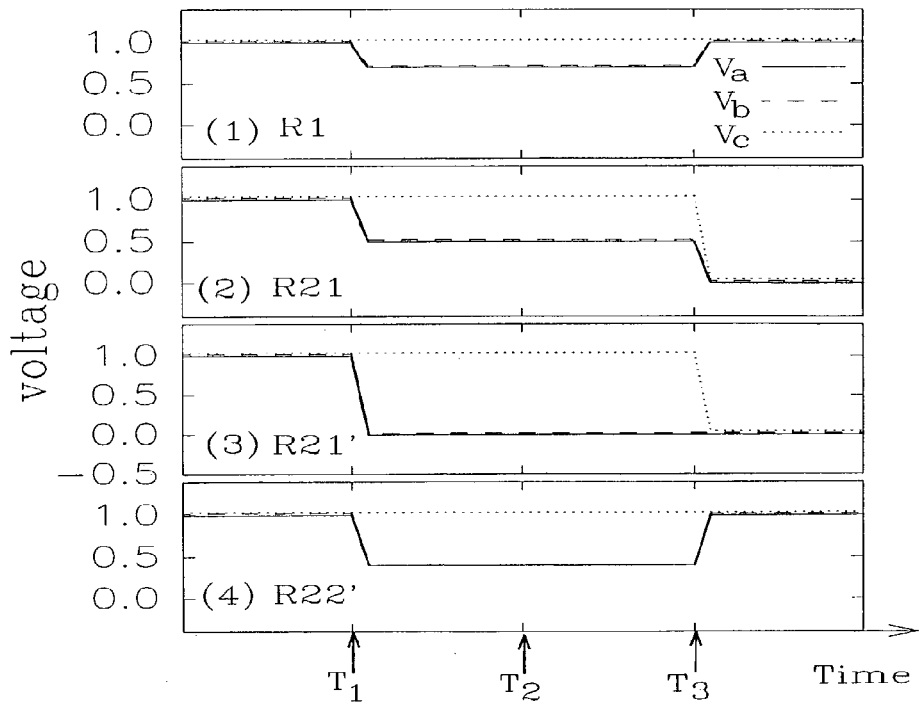
Figure 4b (Fault phase 'a'-'b' on Line L21)

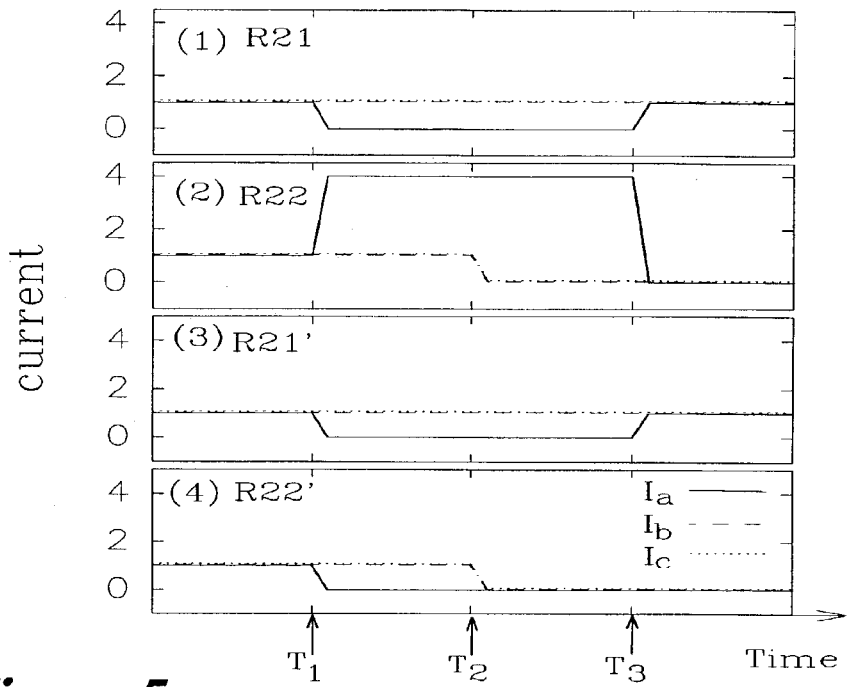
Figure 5a (Fault phase 'a'-'e' on Line L22 near busbar)
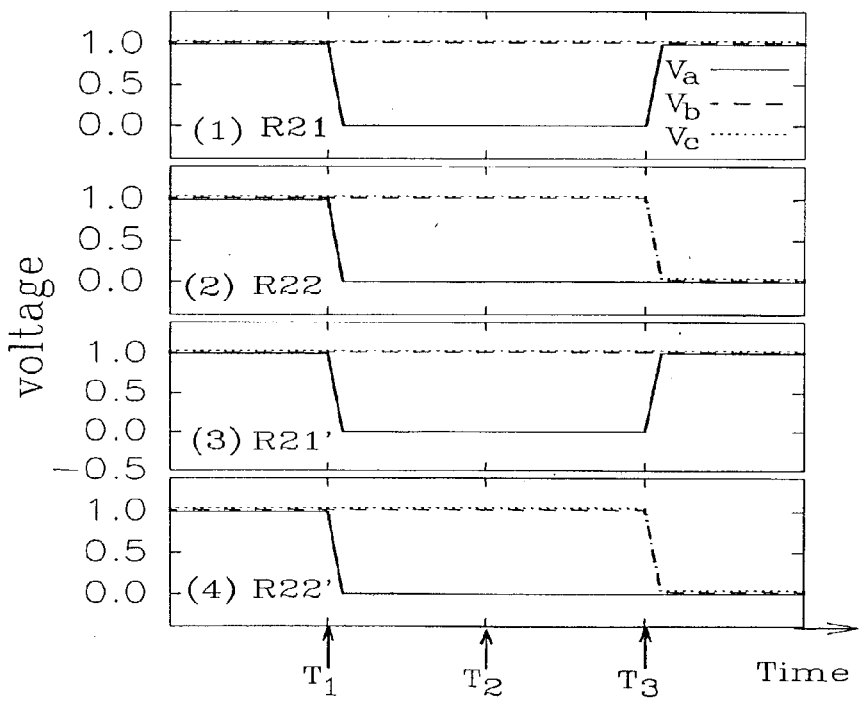
Figure 5b (Fault phase 'a'-'e' on Line L22 near busbar)

POWER LINE PROTECTION

FIELD OF THE INVENTION

The present invention relates to protection of electrical power lines, and in particular to an improved way of protecting so-called "radially connected" power line systems.

BACKGROUND OF THE INVENTION

One of the most important known fault protection techniques for power lines (including power cables) is the so-called Overcurrent (OC) protection technique. See, e.g., GEC Alsthom Protection and Control Ltd, "Protective Relays Application Guide", Third Edition, June 1987. Protection devices using the technique monitor the current in the power line through connections to current transformers in the line and when the current exceeds a predefined threshold, the protection device issues a trip signal to open a power line circuit breaker associated with the device. Such protection devices are conveniently referred to as 'relays' and they have current and time settings which are adjustable to grade the settings with respect to the settings of their neighboring relays to allow correct discrimination to be achieved during fault or overload conditions. In power networks having several sections of power line connected in series without significant impedance at their junctions, and where the source impedance is much greater than the impedance of the sections, there will be little difference between the magnitudes of currents which flow for faults in different positions on the network. In these circumstances, grading of the relays' current settings ("current grading") is not able to offer satisfactory performance, so correct discrimination is obtained during fault conditions by using time graded relays, i.e., relays set to operate after different time delays. The timing difference between the relays associated with adjacent sections can be made sufficient to allow the appropriate circuit-breaker to open and clear the fault on its section before the relay associated with adjacent section nearer to the source can initiate the opening of its circuit breaker.

FIG. 1 shows a radially connected power line system provided with a known type of protection scheme based on time graded OC relays. Looked at from the source end of the system, a source S feeds power onto a busbar 1 and a line section L1 feeds current from busbar 1 to busbar 2. Current flowing in line section L1 near busbar 1 is measured by a current transformer CT, whose signal is passed to a relay R1 for controlling an associated circuit breaker B1, shown by the symbol X. The current fed into busbar 2 by section L1 is distributed to two further sections L21 and L22, which are connected to busbar 2 in parallel (though of course each of L21 and L22 considered individually is in series with L1). Sections L21 and L22 in turn carry the current to two further busbars 31 and 32, each of which have further line sections L31, L32, L33, etc., connected to them in parallel, and so on to complete the system. Hence, in such a power line system, current is said to radiate from the source end of the system to its far end through the above-described branching paths comprising "radially connected" power line sections. Similarly to section L1, each further line section L21, L22, etc., is provided with its own current transformer feeding line section current measurements to protection relays R21, R22, etc., with their associated circuit breakers B21, B22, etc. Each relay R1, R21, R22, etc., with its associated circuit breaker and line current transformer (which may be combined with a voltage transformer) is installed proximate, i.e., at or near, the electrically upstream end of each line section, this being the end nearest the source.

In such a power line system, with a single generating source at one end as shown, fault currents can flow in only one direction, i.e., from source to fault. To protect their line sections, each relay installed at a different position on the system is arranged to operate with a different time delay. The sequence from right to left is tf4→tf3→tf2→tf1, with operating times of 0.1→0.5→0.9→1.3 seconds, respectively. As can be seen from FIG. 1, the relays located in line sections nearer the source S have slower operating times than the relays in sections further away. A fault such as F1 in section L1 will cause higher current levels than a fault such as F3 in a section remote from the source S. In fact, fault currents in section L1 are likely to be so high that they can only be allowed to persist for a short period, which conflicts with the requirement for slower operating times. It will therefore be realized that although it is very easy to select the slower operating times needed to ensure that correct discrimination will be achieved when relays with predetermined time delays are used, their use must be restricted to networks with relatively few serially connected sections.

SUMMARY OF THE INVENTION

An object of this invention is therefore to enable protection relays in radially connected power line systems to make an accelerated operating decision by adapting to the prevailing system and fault conditions, thereby significantly reducing the operating time in situations where previously known types of time graded overcurrent relays cannot offer satisfactory performance.

The invention can secure the above objective by utilizing two types of novel relay functions in conjunction with each other.

In an electrical power line system of the type comprising radially connected power line sections, wherein a first electrically upstream one of the line sections is connectable to a power source, the invention provides a protection system comprising at least one relay installed proximate at least the upstream end of each line section to protect that line section, each relay having an associated circuit breaker, the relays being provided with a first set of accelerated overcurrent functions and a second set of under-current/under-voltage functions, the relays being directional and the first and second sets of functions being time graded in reverse to each other, the first and second sets of functions being distributed amongst the relays such that if an under-current/under-voltage function in a second relay located downstream of a first relay triggers operation of a circuit breaker associated with the second relay, an accelerated overcurrent function in the first relay triggers accelerated operation of a circuit breaker associated with the first relay, thereby to isolate from the power source the line section that the first relay protects.

Advantageously, those relays which are provided with the second set of functions may additionally possess an autorecloser function.

It should be understood that in one of its forms, the invention envisages distribution of the first and second sets of functions amongst the relays so that each relay has only one function. In this case, a relay is provided proximate both ends of individual line sections, the relay at the upstream end of each line section being provided with an accelerated overcurrent function and the relay at the downstream end of each line section being provided with an under-current/under-voltage function.

It will be understood that distribution of the two sets of functions in the above way effectively creates two different sets of relays, categorized according to the function they possess. Hence, the invention can also be said to provide a protection system for an electrical power line system comprising radially connected power line sections and a power source for feeding a first electrically upstream one of the line sections connected to the power source, the protection system comprising first and second sets of time-graded relays and their associated circuit breakers, wherein the two sets of relays work together to protect the power line system from fault conditions, the first set of relays and their associated circuit breakers being installed proximate upstream ends of line sections in the power line system to protect the line sections, the second set of relays and their associated circuit breakers being installed proximate the downstream ends of the line sections and being time-graded in reverse to the relays in the first set, each relay in the first set having an overcurrent function operative to trip an associated circuit breaker after a predetermined time delay if the relay detects a fault downstream thereof, each overcurrent function including or being associated with an accelerated trip function operative to trip an associated circuit breaker before the predetermined time delay has elapsed if the relay in the first set detects operation of a circuit breaker associated with a relay in the second set that is on the same line section as the relay in the first set, each relay in the second set having a directional under-current and under-voltage function thereby to initiate rapid opening of an associated circuit breaker if a fault occurs upstream thereof.

Advantageously, the relays in the second set of relays may also possess an autorecloser function.

It should further be understood that in an alternative form, the invention envisages distribution of the first and second sets of functions amongst the relays so that each relay except the most upstream relay has two functions. In this case, a relay is only provided proximate the upstream end of each line section, each relay being provided with an accelerated overcurrent function and each relay except the relay in the first line section further having a directional under-current and under-voltage function.

Hence, the invention can alternatively be said to provide a protection system for an electrical power line system comprising radially connected power line sections and a power source for feeding a first electrically upstream one of the line sections connected to the power source, the protection system comprising a time-graded relay and an associated circuit breaker installed proximate an upstream end of each line section to protect that line section from fault conditions, each relay having an overcurrent function operative to trip its associated circuit breaker after a predetermined time delay if the relay detects a fault downstream thereof, each overcurrent function including or being associated with an accelerated trip function operative to trip the associated circuit breaker before the predetermined time delay has elapsed if the relay detects operation of a circuit breaker in a downstream adjacent line section, each relay except the relay in the first line section further having a directional under-current and under-voltage function operative to initiate rapid opening of an associated circuit breaker if a fault occurs upstream thereof.

BRIEF DESCRIPTION OF THE DRAWINGS

Exemplary embodiments of the invention will now be described with reference to the accompanying drawings, in which:

FIGS. 3a, 3b, 4a, 4b, 5a and 5b are graphical representations of the responses of the relays of FIGS. 2a and 2b to various faults on the power lines.

DETAILED DESCRIPTION OF THE PREFERRED EMBODIMENTS

Figure 1:
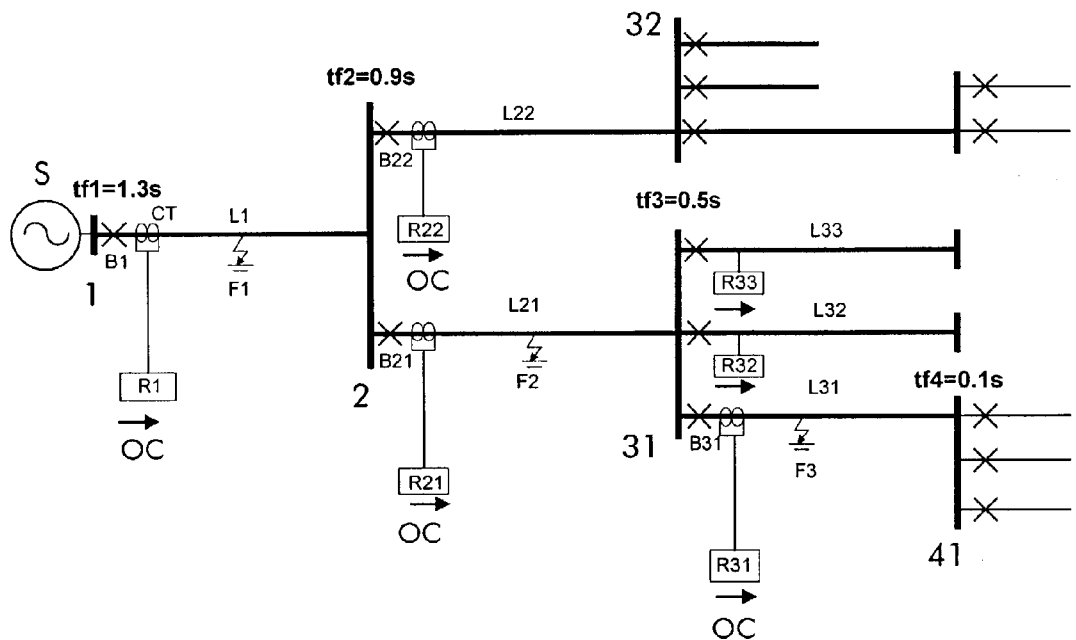
FIG. 1 is an equivalent circuit of a multi-section radially connected power line system provided with relays adapted to implement a known type of time graded overcurrent protection scheme.
Figure 2A:
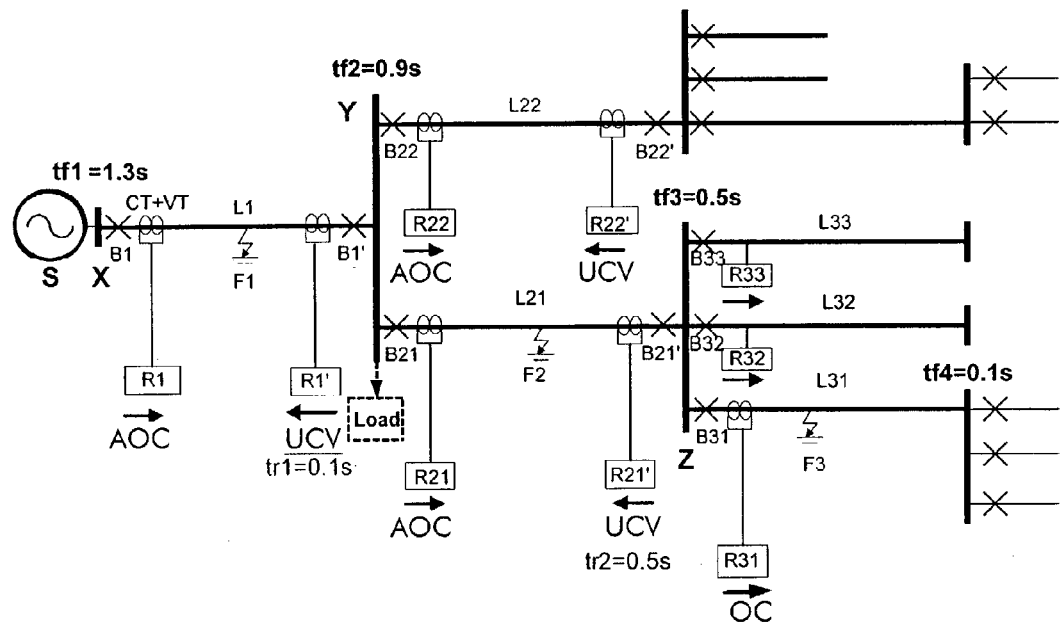
FIGS. 2a and 2b are equivalent circuits of multi-section radially connected power line systems provided with relays adapted to implement the present invention.
Figure 2B:
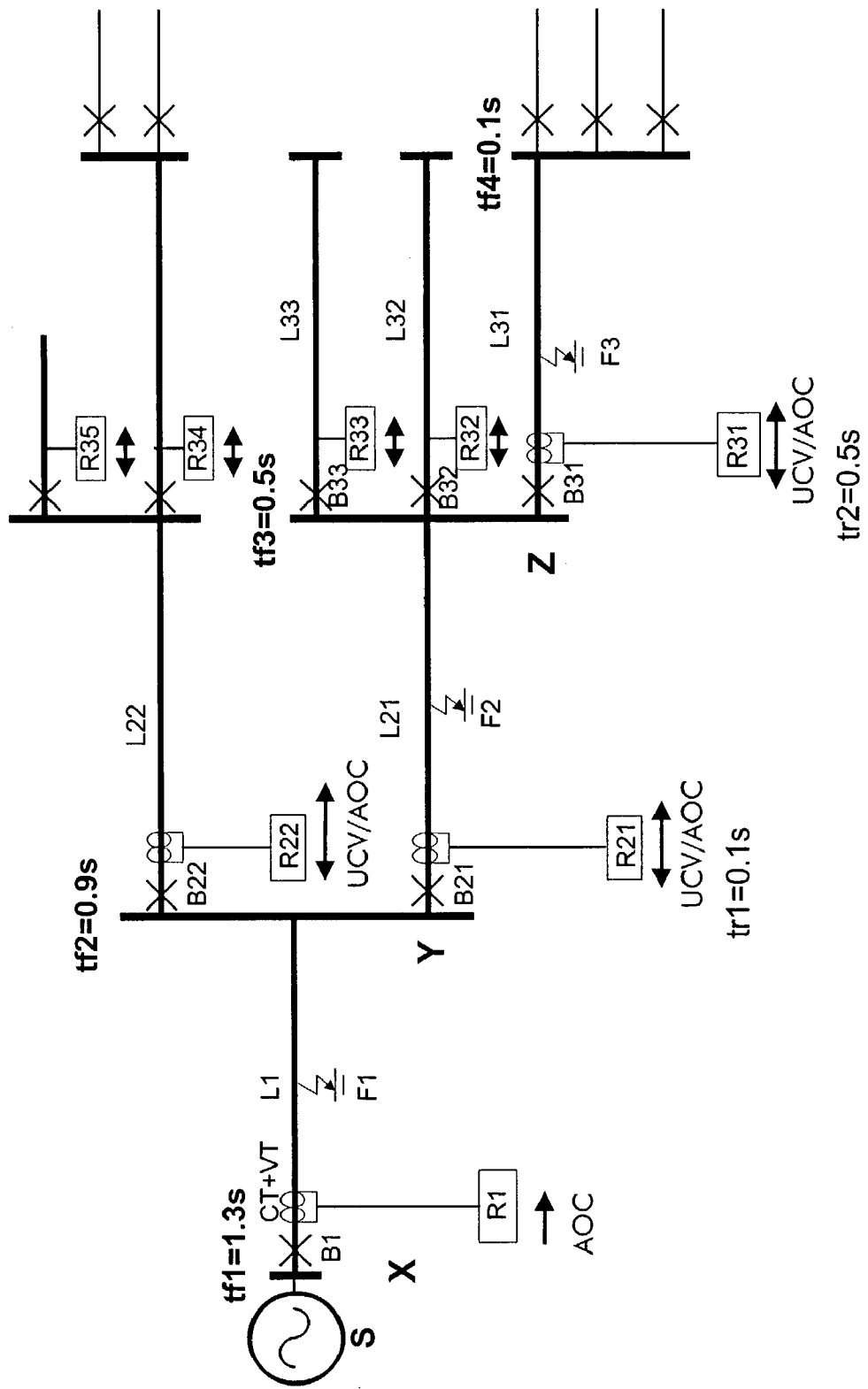

In FIGS. 1, 2a and 2b, the arrows next to the relays R1, R21, etc., are used to indicate the directions of a fault to which the relays will respond. OC indicates an overcurrent protection function of relays R1, R21, R22, R31, etc., in FIG. 1 and R31 in FIGS. 2a and 2b; AOC indicates an accelerated overcurrent protection function of relays R1, R21 and R22 in FIGS. 2a and 2b; UCV represents an under-current and under-voltage protection function of relays R1', R21', R22' in FIG. 2a and of relays R21, R22 and R31 in FIG. 2b; tf1, tf2, tf3 and tf4 are the settings for the forward operating times of the OC and AOC relays at their different locations in FIGS. 1, 2a and 2b; and tr1 and tr2 are the settings of the reverse operating times of the UCV relays R1' R21' and R22' in FIG. 2a and of relays R21, R22 and R31 in FIG. 2b.

It should also be noted that in FIGS. 2a and 2b, the various relays shown are each associated with a respective circuit breaker B1, B1', B21, B21', etc., and respective current and voltage transformers CT+VT, which supply measurements of line current and line voltage to the relays. Of course, the current and voltage measurements are for all three phases of the electrical supply to enable the relays to continuously monitor all three phases. Likewise, the circuit breakers operate on all three phases.

According to the FIG. 2a embodiment of the invention, the relays are divided into two sets which work together to protect the power system:

(1) The AOC set. Relays in this set have an accelerated overcurrent (AOC) function. This comprises an overcurrent function (OC), known per se, which further includes, or is associated with, an accelerated trip function according to the invention. These relays are installed near the source ends of the line sections they are protecting, i.e., in so-called "upstream" positions. The OC function of these relays is responsible for detection of the fault and the accelerated trip function is responsible for accelerated operation of the associated circuit breaker after the relay has detected the fault.

(2) The UCV set. Relays in this set have a directional under-current and under-voltage (UCV) function as well as an autorecloser function. They are installed at the remote or "downstream" ends of the protected lines. They initiate instant tripping of their circuit breakers if a fault occurs upstream of the protected section (i.e., on its source side). This enables the AOC relays to determine whether the fault is on the line section they are protecting. Compared to the AOC relays the UCV relays are time graded in reverse, i.e., from the source to the loads.

The system configurations shown in FIGS. 2a and 2b illustrate the two main embodiments of the invention. Their basic principles are very similar and FIG. 2a is used as an example to demonstrate the first main embodiment. The second main embodiment can be easily explained once the basic principle of the first one is understood.

The multi-section radially connected power line system FIG. 2a has four stages, each consisting of a number of line sections, L1, L21, L22, L31 etc. AOC relays R1, R21, R22 and UCV relays R1', R21', R22' are constituted in accordance with the present invention, but OC relays R31, R32, R33 are a known type of overcurrent protection relay. Circuit breakers B1, B21, B22, B31, B32, etc., are associated with their respective AOC and OC circuit breakers for the protection of each associated line section as shown in the Figure. Circuit breakers B1', B21' and B22' are associated with the UCV relays and are normally used for the protection of their associated busbars 'Y' and 'Z' respectively. The operating times of these relays in the conventional time grading system are as shown in the Figure, for example, relay R31 has been set to have a forward operating time of tf3=0.5 second. However, the operating times of the UCV set of relays are reverse graded, for example, relay R1' has been set to have a reverse operating time of tr1=0.1 second and relay R21' has been set at tr2=0.5 second.

Invention relays R1, R1', R21, R21', R22 and R22' are responsible for the accelerated protection of their associated line section L1, L21 and L22. A first operational set of AOC relays R1, R21 and R22 is installed at or near the upstream ends of the line sections they are protecting (i.e., they are installed at the ends of the line sections which are nearest the source S). This first set of relays has two main functions; (i) initial forward fault detection based on the known OC principle and (ii) accelerated operation using the AOC principles of the invention for a fault occurring on its protected section. UCV relays R1', R21' and R22' constitute a second operational set and are installed at the downstream (remote or receiving) ends of their respective protected sections L1, L21 and L22. They are responsible for fast detection of fault currents from the direction of the source to the location where the relays are installed. Unlike known OC relays, which rely on increases in current magnitude (overcurrent) for fault detection, the UCV relays rely on decreases in current magnitude (i.e., undercurrent), and voltages (i.e., undervoltage), for fault detection, or directional undercurrent and undervoltage. The UCV relays are also equipped with a conventional autorecloser function, this being defined as automatically reclosing their associated circuit breakers B1', B21', B22' following a fixed time delay after a relay has triggered them open.

When a fault occurs on section L31, for example at the point 'F3', the relays R1, R21 and R31 will detect the fault due to the changes in current, but the conventional OC relay R31 will operate at a fixed shorter time setting of 0.5 second to trigger its circuit breaker B31, thereby isolating the fault from the other line sections and so preventing relays R1 and R21 from triggering their circuit breakers. On line section L31, the time setting of conventional OC relay R31 is thought to be sufficiently short to avoid the damaging effect of high fault current levels.

Typical Response for Fault on L1

For a fault occurring in one or two phases on section L1 at the point 'F1' in FIG. 1, the operating time for the known relay R1 will be 1.3 seconds as shown, which is undesirably long. In respect of FIG. 2a, it will be remembered that each relay can detect voltage and current for all three phases in its respective line section, because it receives line voltage and line current measurements from its associated current and voltage transformers CT+VT. Hence, the relay R1' can detect a fault F1 using the UCV function of the invention, because the voltage and current at relay R1' drop to near zero on the phase experiencing the fault. Relay R1' will therefore trip its associated three-phase circuit breaker B1' instantly (or at least very rapidly), or else after a short delay, as explained below. Opening of circuit breaker B1' causes the line section L1 to become open circuit at end Y, but it does not clear the fault on line section L1, because the fault is between relays R1 and R1'. However, because all three phases have been interrupted by the circuit breaker B1' the current in the unfaulted or "healthy" phase drops to zero at end X, even though current continues to flow in the faulted phase(s). Because of this unbalanced current condition, relay R1 will detect that circuit breaker B1' has opened, thereby detecting that the fault is on the protected line section L1. Consequently, instead of waiting for the fixed time delay of 1.3 seconds, R1 instantly opens its associated circuit breaker B1. Detection of the operation of circuit breaker B1' only takes a few power frequency cycles, so the operating time of R1 is significantly accelerated by the invention. Furthermore, relay R1 is programmed to detect tripping of breaker B1' by relay R1' within a predefined time window from fault inception, and this also facilitates correct detection of remote circuit breaker operation B1' by relay R1. After a fixed time period within which breaker B1 can be tripped, relay R1' will issue a reclosing commend and close circuit breaker B1'.

It may be that a radially connected power line system is connected to the end of another power line system through its busbar X, the other system then being the source S. Relay R1' may therefore require a time margin to delay its operation and thereby allow for any fault from upstream of the source side of the system. At higher voltage levels from the upstream side of the source, the power lines are mostly protected by protection relays based on fast techniques, such as current differential or distance protection schemes. The operating time of the upstream protection will be under 0.1 second. This time is the summation of the relay operating time, which is normally under 40 ms, and the breaker operation time, which is about 40 to 60 ms.

Typical Response for Fault on L21

Similarly, for a fault F2 occurring on section L21, the relay R21' will detect this fault condition based on its UCV function and trip its associated circuit breaker B21' after a fixed time delay tr2=0.5 second. Opening of circuit breaker B21' causes the line section L21 to become open circuit at one end, but it does not clear the fault. Consequently, relay R21 will detect the opening of the circuit breaker B21' because of the unbalanced current flows in the three phases. Instead of waiting for the fixed time delay of 0.9 seconds as in known schemes, R21 will instantly open its associated circuit breaker B21 so isolating the fault from the line section L1 and restraining relay R1 from issuing a tripping signal. After a fixed time period within which tripping of B21 can occur, relay R21' will issue a reclosing command to close circuit breaker B21'.

Typical Response for Fault on or Near Busbar 'Y'

When a fault occurs near busbar 'Y' on line sections L21 or L22, both R21' and R22' will detect the fault and trip their associated breakers B21' and B22' and the healthy phase currents of both lines drop to zero. Relay R21 or R22 on the faulted line section can easily detect such a change and trip its associated breaker in accelerated mode but the relay on the healthy line section will give no response since there is no fault detected on its section. Again, after a fixed time window within which operation of B21 or B22 is expected, relay R21' or R22' on the healthy section will issue a reclosing command and close its associated circuit breaker.

Opening of B21' and B22' will also drop the healthy phase currents at relay R1 to zero if there is no load connected at busbar 'Y', i.e., relay R1 will experience the same condition as it did after B1' tripped. However, R1 will only respond within 0.5 second from inception of the fault because operation of B1' is expected within this time. Breakers B21' and B22' will not operate after the 0.5 second delay (tr2) as shown in the Figure. Therefore, correct operation of R1 can be achieved.

Instant Operation of R21' and R22' When There is a Load on Busbar 'Y'

The relays R21' and R22' can also be set to instant operating mode if there is load present on the busbar 'Y' as shown in FIG. 2a. In this mode, the relays will trip their associated circuit breakers B21' and B22' instantly, using their UCV function, instead of delaying for tr2 (0.5 second). By this arrangement, the response speed of the relays protecting L21 and L22 can be further speeded up.

Although this operation is not necessary for a fault on line section L1, it will not affect the overall performance of the proposed technique. This is because tripping of the circuit breaker B1' by relay R1' will disconnect the power supply to line section L21 and L22, so tripping of the circuit breakers R21' and R22' will have no adverse effect on operation of the system.

For an out-of-zone fault near busbar 'Y' on line section L21 or L22, instant opening of both B21' and B22' will not reduce the healthy phase currents to zero as seen from relay R1, since there is continued current flow to the load at the busbar 'Y'. Consequently, R1 will not operate in an accelerated mode for this fault.

The second main embodiment of the invention is used in system configurations like that shown in FIG. 2b. The major difference is that the relays R1', R21' and R22' in FIG. 2a are not present in FIG. 2b. The reason is that for some system configurations, current transformers CT may not be available at the locations for R1', R21' and R22', therefore the UCV function is incorporated into relays R21 and R22, R31, R32 and R33 respectively. For example, relay R21 will not only be responsible for OC and AOC protection for line section L21, but also for UCV protection of line section L1. R21 and R22 together in FIG. 2b will take the role of relay R1' in FIG. 2a. When a fault occurs on line section L1, the UCV function of relays R21 and R22 (with the arrow pointed to the left) will detect the fault and open their associated circuit breakers B21 and B22, so making line section L1 an open circuit at one end. Hence, with no load directly connected to busbars 'Y' and 'Z' in this embodiment, the healthy phase currents on L1 drop to zero, which enables R1 to detect the operation of the circuit breakers B21 and B22. In this case, opening of the breakers B12 and B22 means that the fault is on the protected section L1, therefore, R1 operates in accelerated mode to trip its associated breaker B1 and the fault is isolated.

Based on the same principle, the UCV functions of relays R31, R32 and R33 will also give corresponding responses for a fault F2 on line section L21 to enable the accelerated tripping function of upstream device R21.

EXAMPLES

Based on the configuration given in FIG. 2a, the following examples are used to demonstrate the performance of the invention relays. These examples also apply to the system configuration given in FIG. 2b. Each of FIGS. 3a, 3b, 4a, 4b and 5a, 5b consists of four graphs (1) to (4) showing the responses of relays R1, R1', R21' and R22' respectively to a fault. FIGS. 3a, 4a, 5a show the responses in terms of the three phase currents Ia, Ib and Ic and FIGS. 3b, 4b and 5b, show the responses in terms of the three phase voltages Va, Vb and Vc.

1. Responses to Single Phase Fault on Line Section L1

FIGS. 3a and 3b show the responses of the relays R1, R1', R21' and R22' when they detect a phase 'a' to earth fault F1 on line section L1 as shown in FIG. 2a. After inception of the fault at time $T_1$, there is a significant increase in the faulted phase current Ia and a drop in faulted phase voltage Va at relay location R1 as shown in FIGS. 3a(1) and 3b(1). The faulted phase current and voltage drop to zero at relay R1' as shown in FIGS. 3a(2) and 3b(2). Relays R1 and R1' will detect the fault based on their OC and UCV functions respectively, and relay R1' which has an instant operating time setting will make a trip decision and open circuit breaker B1' at time $T_2$. After the opening of B1', line section L1 becomes open circuit at one end and the currents Ib, Ic of the unfaulted phases 'b' and 'c' drop to zero at relay R1 as shown in FIG. 3a(1). However, the phase 'a' to earth fault is not cleared from the line section L1, so R1 detects this unbalanced operating condition and makes a trip decision to open the associated circuit breaker B1 at time $T_3$.

As shown in FIG. 3, the time delay from the fault inception at time $T_1$ to the opening of the circuit breaker B1 at time $T_3$ mainly consists of 2 time periods, t12 and t23. The first time period t12 consists of the time period from fault inception to the opening of the circuit breaker B1'. This time period t12 is subdivided into two periods, fault detection by relay R1' and the response time of breaker B1'. Allowing a safety margin, a maximum time period of 0.1 second will guarantee the issue of a tripping signal by relay R1' and opening of the circuit breaker only takes a few power frequency cycles. The second time period t23 consists of the time taken for relay R1 to identify the operation of breaker B1', which can be accomplished within one power frequency cycle, plus the response time of the circuit breaker B1, which is approximately 2 to 4 cycles depending on the circuit breaker used. Therefore, the entire operation can be implemented within 0.2 seconds from fault inception. In the known scheme as shown in FIG. 1, however, a relay at the location of R1 would not even issue a trip signal until 1.3 seconds had elapsed.

In FIG. 2b, instead of R1' in FIG. 2a, relays R21 and R22 equipped with the UCV function will operate first to enable tripping of R1 in accelerated mode.

2. Responses to Phase-to-Phase Fault on Line Section L21

FIG. 4 shows the responses of the invention relays R1, R21, R21' and R22' to a phase 'a' to phase 'b' phase-to-phase fault on line section L21 in FIG. 2a. After fault inception at time $T_1$, there is a significant increase in the faulted phase currents Ia, Ib and a drop in faulted phase voltages Va, Vb at locations R1 and R21, as shown in FIGS. 4a(1–2) and 4b(1–2). The faulted phase currents and voltages drop to zero at location R21' as shown in FIGS. 4a(3) and 4b(3). The relays R1, R21 and R21' will detect the fault. R21', which has the fastest operating setting, will operate instantly (if there is a load connected at busbar 'Y') or with a 0.5 second delay (if there is no load connected at busbar 'Y') and subsequently the circuit breaker B21' opens at the time $T_2$.

After opening of the circuit breaker B21', the line section L21 becomes open circuit at one end, the unfaulted phase 'c' current drops to zero at R21 location as shown in FIG. 4a(2), but the phase 'a' and 'b' fault is not cleared from the line section L21. Therefore, R21 detects opening of the circuit breaker B21', makes a trip decision and opens the associated circuit breaker B21 at time $T_3$. This speeds up the operating time of R21 significantly.

Although the current of the unfaulted phase 'c' also drops significantly at R1 after the opening of B21' at $T_2$ as shown in FIG. 4a(1), there is still substantial current flowing in the phase due to the supply to the rest of the system, such as line section L22. Hence, R1 detects that the fault is not on its protected section and does not operate.

In FIG. 2b, instead of R21' in FIG. 2a, relays R31, R32 and R33 equipped with the UCV function will operate first to enable the tripping of R21 in accelerated mode.

3. Responses to Single Phase to Earth Fault on Line Section L22 Near Busbar 'Y'

FIG. 5 show a phase 'a' to earth fault on line section L22 near busbar 'Y'. With a fault in this position, the relays R21' and R22' cannot distinguish between a fault on line section L21 and a fault on line L22, so causing unnecessary operation of breaker B21' if the fault is on line L22. As shown in FIGS. 5a–b(3) and 5a–b(4), both R21' and R22' detect the undercurrent and undervoltage on phase 'a' since the fault is close to busbar 'Y'. As a result, both relays issue trip signals to open circuit breaker B21' and B22' respectively. Afterward, R22 detects the drop of healthy phase ('b' and 'c') currents and at the same time the fault on phase 'a'. Consequently, R22 operates in accelerated mode to open its associated breaker B22 and the fault is isolated at $T_2$. R21, however, will give no response since there is no fault detected on the line section L21. The following reclosing operation by R21' will restore the power supply to line section L21.

Again, there are two operation modes for R21' and R22': instant operation, when there is a load connected at 'Y'; and a (0.5 second) delayed operation, when there is no load at 'Y'. The reason is that the operation of R21' and R22' will reduce the healthy phase currents at R1 to zero when there is no load connected at 'Y', R1 will wrongly detect it as the operation of R1' and make a trip decision if R21' and R22' operate instantly. In this situation, R1 will be able to discriminate the operation performed by R1' or R21' and R22' by the time delay introduced.

In FIG. 2b, instead of R21' and R22' in FIG. 2a, R31 to R35 equipped with the UCV function will operate first to enable accelerated operation of breaker B22 by relay R22. After opening of B22, R31, R32, R33, R34 and R35 will automatically reclose their associated circuit breakers.

OBSERVATIONS

The levels of the phase currents shown in the graphs of all the above examples are of nominal values for demonstration purpose. The present invention works under all levels of system voltages, source parameters, pre-fault and post-fault load flow conditions.

The examples show the detection of system unbalanced operating condition and breaker operation based on levels of currents and voltages. The invention can also be based on algorithms and criterion expressed in different forms.

The examples given in the document are based on the use of definite time (DT) OC relays. However, it is obvious that the invention can also be easily applied in schemes where Inverse Definite Minimum Time (IDMT) OC relays are used in the time grading co-ordination.

The various relay functions mentioned or described in the specification, such as Overcurrent (OC, including DT and IDMT), Accelerated Overcurrent (AOC), Undercurrent and Undervoltage (UCV), can all be readily implemented in present-day microprocessor-controlled relays by means of appropriate programming. Furthermore, the invention can also be easily implemented with conventional relays such as electromechanical relays or static relays, where the levels of the currents and voltages can trigger breaker actions through electromechanical or electronic circuits.

Although the examples given above are based on a configuration of a multi-section single-circuit plain feeder system, the invention can be applied to systems with more sections, different configurations and systems containing power apparatus in the line section, such as power transformers. It is also evident that more stages of UCV relays can be added to the system to enable accelerated operation for more line sections by the use of the reverse time grading method.

The devices R21', B21', etc., are described above as relays and circuit breakers. In practice they can take different forms, such as reclosers and sectionalisers which incorporate the UCV function required for practicing the invention.

I claim:

1. In an electrical power line system of the type comprising radially connected power line sections, wherein a first electrically upstream one of the line sections is connectable to a power source, a protection system comprising: at least one relay installed proximate at least the upstream end of each line section to protect that line section, each relay having an associated circuit breaker, the relays being provided with a first set of accelerated overcurrent functions and a second set of under-current/under-voltage functions, the relays being directional and the first and second sets of functions being time graded in reverse to each other, the first and second sets of functions being distributed amongst the relays such that if an under-current/under-voltage function in a second relay located downstream of a first relay triggers operation of a circuit breaker associated with the second relay, an accelerated overcurrent function in the first relay triggers accelerated operation of a circuit breaker associated with the first relay, thereby to isolate from the power source the line section that the first relay protects.

2. The protection system of claim 1, in which the first and second sets of functions are distributed amongst the relays so that each relay has only one function, a relay being provided proximate both ends of individual line sections, the relay at the upstream end of each line section being provided with an accelerated overcurrent function and the relay at the downstream end of each line section being provided with an under-current/under-voltage function.

3. The protection system of claim 1, in which relays provided with the second set of functions additionally possess an autorecloser function.

4. The protection system of claim 1, in which the first and second sets of functions are distributed amongst the relays so that each relay except the most upstream relay has two functions, a relay being provided proximate only the upstream end of each line section, each relay being provided with an accelerated overcurrent function and each relay except the relay in the first line section further having a directional under-current and under-voltage function.

5. A protection system for an electrical power line system comprising radially connected power line sections and a power source for feeding a first electrically upstream one of the line sections connected to the power source, the protection system comprising: first and second sets of time-graded relays and their associated circuit breakers, wherein the two sets of relays work together to protect the power line system from fault conditions, the first set of relays and their associated circuit breakers being installed proximate upstream ends of line sections in the power line system to protect the line sections, the second set of relays and their associated circuit breakers being installed proximate the downstream ends of the line sections and being time-graded in reverse to the relays in the first set, each relay in the first set having an overcurrent function operative to trip an associated circuit breaker after a predetermined time delay if the relay detects a fault downstream thereof, each overcurrent function including or being associated with an accelerated trip function operative to trip an associated circuit breaker before the predetermined time delay has elapsed if the relay in the first set detects operation of a circuit breaker associated with a relay in the second set that is on the same line section as the relay in the first set, each relay in the second set having a directional under-current and under-voltage function, thereby to initiate rapid opening of an associated circuit breaker if a fault occurs upstream thereof.

6. The protection system in accordance with claim 5, in which the relays in the second set of relays additionally possess an autorecloser function.

7. A protection system for an electrical power line system comprising radially connected power line sections and a power source for feeding a first electrically upstream one of the line sections connected to the power source, the protection system comprising a time-graded relay and an associated circuit breaker installed proximate an upstream end of each line section to protect that line section from fault conditions, each relay having an overcurrent function operative to trip its associated circuit breaker after a predetermined time delay if the relay detects a fault downstream thereof, each overcurrent function including or being associated with an accelerated trip function operative to trip the associated circuit breaker before the predetermined time delay has elapsed if the relay detects operation of a circuit breaker in a downstream adjacent line section, each relay except the relay in the first line section further having a directional under-current and under-voltage function operative to initiate rapid opening of an associated circuit breaker if a fault occurs upstream thereof.

* * * * *